United States Patent
Nishioka et al.

(10) Patent No.: US 9,599,913 B2
(45) Date of Patent: Mar. 21, 2017

(54) ELECTROPHOTOGRAPHIC MEMBER, PROCESS CARTRIDGE AND ELECTROPHOTOGRAPHIC APPARATUS

(71) Applicant: CANON KABUSHIKI KAISHA, Tokyo (JP)

(72) Inventors: Satoru Nishioka, Suntou-gun (JP); Kazuhiro Yamauchi, Suntou-gun (JP); Masahiro Watanabe, Mishima (JP); Masaki Yamada, Mishima (JP); Hideya Arimura, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 325 days.

(21) Appl. No.: 14/296,012

(22) Filed: Jun. 4, 2014

(65) Prior Publication Data
US 2014/0287899 A1 Sep. 25, 2014

Related U.S. Application Data

(63) Continuation of application No. PCT/JP2013/007255, filed on Dec. 10, 2013.

(30) Foreign Application Priority Data

Dec. 13, 2012 (JP) ................. 2012-272394

(51) Int. Cl.
| | |
|---|---|
| B05C 1/08 | (2006.01) |
| B32B 27/40 | (2006.01) |
| G03G 15/02 | (2006.01) |
| G03G 5/02 | (2006.01) |
| G03G 15/08 | (2006.01) |
| C08G 18/48 | (2006.01) |
| C08G 18/10 | (2006.01) |
| G03G 5/10 | (2006.01) |
| G03G 21/18 | (2006.01) |

(52) U.S. Cl.
CPC ........... *G03G 5/02* (2013.01); *C08G 18/10* (2013.01); *C08G 18/4829* (2013.01); *G03G 5/107* (2013.01); *G03G 15/0233* (2013.01); *G03G 15/0818* (2013.01); *G03G 21/18* (2013.01); *Y10T 428/31551* (2015.04)

(58) Field of Classification Search
CPC ........... C08G 18/10; C08G 18/4829; G03G 15/0233; G03G 15/0818; G03G 5/02; G03G 5/107; G03G 21/18; Y10T 428/31551
USPC ........... 428/411.1, 423.1; 399/176; 492/18
See application file for complete search history.

(56) References Cited

U.S. PATENT DOCUMENTS

| | | | |
|---|---|---|---|
| 5,286,566 A | 2/1994 | Schlueter, Jr. et al. | |
| 2014/0221184 A1 | 8/2014 | Arimura et al. | |

FOREIGN PATENT DOCUMENTS

| | | | | |
|---|---|---|---|---|
| JP | 6-299066 A | 10/1994 | | |
| JP | 10-196639 A | 7/1998 | | |
| JP | 2000-112210 A | 4/2000 | | |
| JP | 2003-15403 A | 1/2003 | | |
| JP | 2003-342466 A | 12/2003 | | |
| JP | 2009244423 A | * 10/2009 | ............... | C08F 20/10 |

OTHER PUBLICATIONS

International Preliminary Report on Patentability, International Application No. PCT/JP2013/007255, Mailing Date Jun. 25, 2015.

* cited by examiner

*Primary Examiner* — Ling Choi
*Assistant Examiner* — Chun-Cheng Wang
(74) *Attorney, Agent, or Firm* — Fitzpatrick, Cella, Harper & Scinto (57) ABSTRACT

An electrophotographic member is provided in which conductivity barely reduces and sufficient conductivity is obtained even under a low temperature and low humidity environment, a reduction in resistance beyond necessity is readily suppressed even under a high temperature and high humidity environment, and the bleeding of the quaternary ammonium salt can be suppressed. There is provided an electrophotographic member including an electroconductive mandrel and an electroconductive layer, wherein the electroconductive layer includes a resin having at least one of a structure represented by the following formula (1) and a structure represented by the following formula (2) in the molecule, and an anion:

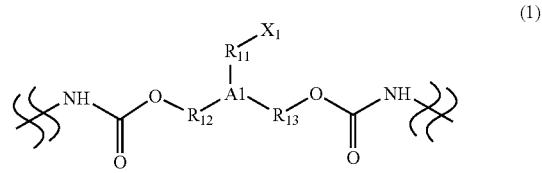

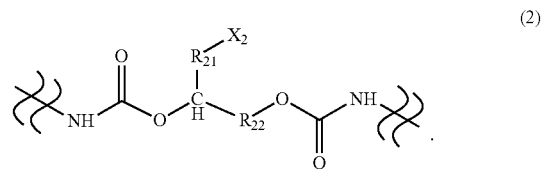

6 Claims, 1 Drawing Sheet

ELECTROPHOTOGRAPHIC MEMBER, PROCESS CARTRIDGE AND ELECTROPHOTOGRAPHIC APPARATUS

CROSS-REFERENCE TO RELATED APPLICATIONS

This application is a continuation of International Application No. PCT/JP2013/007255, filed Dec. 10, 2013, which claims the benefit of Japanese Patent Application No. 2012-272394, filed Dec. 13, 2012.

BACKGROUND OF THE INVENTION

Field of the Invention

The present invention relates to an electrophotographic member, a process cartridge, and an electrophotographic apparatus.

Description of the Related Art

An electrophotographic apparatus, which is an image forming apparatus using an electrophotographic method, includes an electrophotographic member such as a charging roller, a developing roller, and a transfer roller, and the electrophotographic member includes an electroconductive layer having an electric resistance value of approximately $1 \times 10^3$ to $1 \times 10^{10} \Omega$. To adjust the conductivity of the electroconductive layer, an ionic conductive agent such as quaternary ammonium salt compounds may be used.

A merit of the electroconductive layer given conductivity by the ionic conductive agent is that the electric resistance value is more uniform in such an electroconductive layer than that of the electroconductive layer given conductivity by an electron conductive agent such as carbon black.

Meanwhile, the conductivity of the electroconductive layer given conductivity by the ionic conductive agent is very strongly influenced by the moisture content. For example, the electric resistance value increases under a low temperature and low humidity environment, and decreases under a high temperature and high humidity environment. For this reason, it is difficult to maintain a desired conductivity irrespective of the environment.

A higher speed and higher definition of the electrophotographic apparatus these days will cause more image defects if the conductive roller has a higher resistance. For example, a higher resistance of the charging roller may cause horizontal streaks as image defects. A higher resistance of the developing roller will cause unevenness of an image.

The ionic conductive agent may gradually bleed from the inside of the electroconductive layer to the surface of the electroconductive layer as time passes (hereinafter, this phenomenon is also expressed as "bleeding"). As a result, the bleeding may cause change over time in the electric resistance value of the electroconductive layer, change over time in the outer diameter of the electrophotographic member, and adhesion of dirt to the surface of the electrophotographic member. For example, the outer shape of the charging roller may change due to the bleeding of the ionic conductive agent from the charging roller at a press contact portion between the charging roller and a photosensitive member to produce horizontal streaks on an image. For the developing roller, a toner or an external additive may adhere to the surface of the developing roller due to the bleeding of the ionic conductive agent from the developing roller to produce vertical streaks on an image.

Japanese Patent Application Laid-Open No. H10-196639 discloses a semiconductive roller given conductivity by an ionic conductive agent that suppresses the bleeding of the conductive agent while the electric resistance value of the semiconductive roller is adjusted to fall within a proper region independently of an environment in use. Specifically, the semiconductive roller includes a polyurethane elastic layer formed of a polyurethane resin prepared by adding a quaternary ammonium salt containing an ethylene glycol chain having a terminal hydroxy group when a polyol is reacted with a polyisocyanate.

SUMMARY OF THE INVENTION

In Japanese Patent Application Laid-Open No. H10-196639, the polyol, the polyisocyanate, and the quaternary ammonium salt containing an ethylene glycol chain having a terminal hydroxy group are reacted to prepare the polyurethane elastic layer. At this time, the hydroxy group of the quaternary ammonium salt is reacted with the isocyanate and taken into a binder resin to suppress the bleeding of the polyurethane elastic layer.

According to studies by the present inventors, the quaternary ammonium salt is taken into the main chain of the binder resin if the quaternary ammonium salt described in Japanese Patent Application Laid-Open No. H10-196639 has two or more ethylene glycol chains having a terminal hydroxy group. For this reason, the mobility of the quaternary ammonium salt reduces while the electric resistance relatively increases.

When a quaternary ammonium salt having one ethylene glycol chain having a terminal hydroxy group is introduced into the side chain of the binder resin, the mobility of the quaternary ammonium salt can be relatively enhanced, and a lower electric resistance can be attained than that of the polymer main chain into which an ionic conductive group is taken. Under a high temperature and high humidity environment, the polyethylene glycol chain directly bonded to the quaternary ammonium salt will cause a large moisture content to readily exist in the vicinity of the quaternary ammonium salt, in which the electric resistance is locally reduced. When the quaternary ammonium salt has only one hydroxy group, part of the quaternary ammonium salt is not reacted with the isocyanate to remain as an unreacted component. The unreacted quaternary ammonium salt may bleed.

The present invention is directed to providing an electrophotographic member prepared using an ionic conductive agent wherein the electrophotographic member has high conductivity and low environmental dependency, and the bleeding of the ionic conductive agent is effectively suppressed.

Further, the present invention is directed to providing a process cartridge and electrophotographic apparatus that can stably form a high-quality electrophotographic image for a long period of time.

According to one aspect of the present invention, there is provided an electrophotographic member comprising an electroconductive mandrel and an electroconductive layer, wherein the electroconductive layer comprises a resin having at least one of a structure represented by the following formula (1) and a structure represented by the following formula (2) in the molecule, and an anion:

(1)

(2)

wherein, in the formula (1), $R_{11}$ represents an alkylene group; $R_{12}$ and $R_{13}$ each independently represent an alkylene group or an alkylene oxide group; A1 represents a methine group or a nitrogen atom; and $X_1$ represents a quaternary ammonium cation structure; and in the formula (2), $R_{21}$ represents an alkylene group; $R_{22}$ represents an alkylene group or an alkylene oxide group; and $X_2$ represents a quaternary ammonium cation structure.

The process cartridge according to the present invention includes a charging roller mounted on the process cartridge, and is configured to be detachable to an electrophotographic apparatus. The charging roller is the electrophotographic member above.

Furthermore, the electrophotographic apparatus according to the present invention is an electrophotographic apparatus including an electrophotographic photosensitive member, and a charging roller disposed facing the electrophotographic photosensitive member to charge the electrophotographic photosensitive member. The charging roller is the electrophotographic member above.

The present invention can provide an electrophotographic member wherein the electrophotographic member has high conductivity and low environmental dependency, and the bleeding of the ionic conductive agent is effectively suppressed.

The present invention can also provide a process cartridge and electrophotographic apparatus that can form a high-quality electrophotographic image.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present inventors have found that an electroconductive layer including a urethane resin having a quaternary ammonium salt introduced into the side chain of the urethane resin via an alkylene chain as shown in the following formula (1) or (2) exhibits sufficient conductivity even under a low temperature and low humidity environment, the conductivity barely changes by changes in an environment, and the bleeding of an ionic group into the surface of the electroconductive layer can be suppressed.

(wherein, in the formula (1), $R_{11}$ represents an alkylene group; $R_{12}$ and $R_{13}$ each independently represent an alkylene group or an alkylene oxide group; A1 represents a methine group or a nitrogen atom; and $X_1$ represents a quaternary ammonium cation structure; and in the formula (2), $R_{21}$ represents an alkylene group; $R_{22}$ represents an alkylene group or an alkylene oxide group; and $X_2$ represents a quaternary ammonium cation structure).

The present inventors presume from the configuration above how the objects of the present invention can be attained as follows.

The resin having at least one of the structure represented by the above formula (1) and the structure represented by the above formula (2) in the molecule in the present invention has the quaternary ammonium salt disposed in the side chain of the resin via a flexible alkylene structure. It is thought that the high mobility of the quaternary ammonium salt is attributed to the side chain.

This high mobility of the quaternary ammonium salt generates ion dissociation when the quaternary ammonium salt interacts with an alkylene oxide or a polar group that forms the urethane binder resin. It is thought that as a result, sufficient conductivity is exhibited even under a low temperature and low humidity environment in which the moisture content in the binder resin is small.

Next, it is thought that because the resin has a structure in which the quaternary ammonium salt bonds to the hydrophobic alkylene side chain, the resin is difficult to keep the moisture content in the vicinity of the quaternary ammonium salt when the moisture content in the binder resin increases under a high temperature and high humidity environment. It is thought that because the resin is barely influenced by the moisture content contained in the binder resin, changes in the resistance due to changes in the temperature and the humidity are reduced.

Finally, the quaternary ammonium salt as the raw material for the resin barely bleeds because the quaternary ammonium salt bonds to the binder resin. Furthermore, the quaternary ammonium salt as the raw material for the resin has two hydroxy groups to increase the probability that the hydroxy group reacts with the isocyanate. Even if at least one of the hydroxy groups reacts, the quaternary ammonium salt is taken into the binder resin. For this reason, it is thought that the quaternary ammonium salt as the raw material for the resin barely bleeds because an amount of the unreacted quaternary ammonium salt is smaller than that of the quaternary ammonium salt having one hydroxy group. For these reasons above, it is presumed that the resin having the structure(s) represented by the formula (1) and/or the formula (2) can attain sufficient conductivity even under a low temperature and low humidity environment. As a result, the conductivity barely changes by changes in the temperature and the humidity, and the bleeding can be suppressed.

Figure 1A:
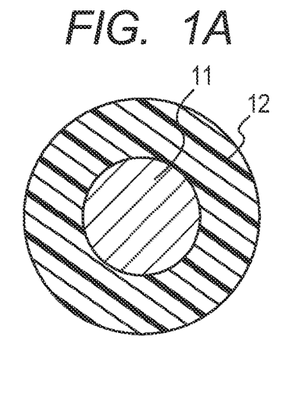
FIG. 1A is a schematic cross sectional view illustrating one example of an electrophotographic member according to the present invention.
Figure 1B:
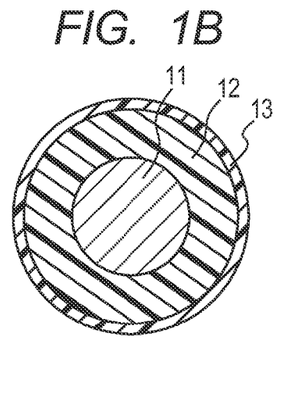
FIG. 1B is a schematic cross sectional view illustrating one example of an electrophotographic member according to the present invention.
Figure 1C:
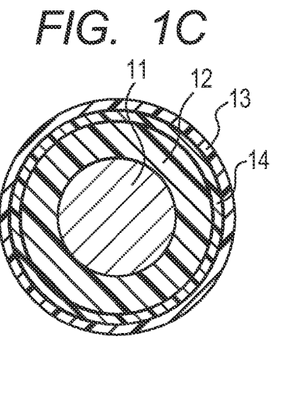
FIG. 1C is a schematic cross sectional view illustrating one example of an electrophotographic member according to the present invention.

Hereinafter, the present invention will be described in detail. As the electrophotographic member, a charging roller and a developing roller will be described in detail below, but applications of the present invention will not be limited to only the charging roller and the developing roller. FIGS. 1A, 1B, and 1C are schematic cross sectional views illustrating the electrophotographic member according to the present invention.

An exemplary charging roller (electrophotographic member) includes a mandrel 11 as an electroconductive mandrel, and an elastic layer 12 disposed on its outer periphery as illustrated in FIG. 1A. The elastic layer 12 is the electroconductive layer according to the present invention.

As illustrated in FIG. 1B, the charging roller may include a surface layer 13 disposed on the surface of the elastic layer 12. In this case, at least one of the elastic layer 12 and the surface layer 13 may be the electroconductive layer containing the resin according to the present invention.

As illustrated in FIG. 1C, the charging roller may have a three-layer structure in which an intermediate layer 14 is disposed between the elastic layer 12 and the surface layer 13, or a multi-layer structure in which a plurality of intermediate layers 14 is disposed. In this case, at least one layer selected from the group consisting of the elastic layer 12, the intermediate layer(s) 14, and the surface layer 13 may be the electroconductive layer containing the resin according to the present invention.

<Electroconductive Mandrel>

The electroconductive mandrel can be properly selected from known electroconductive mandrels in the field of the electrophotographic conductive member, and used. For example, a cylinder made of a carbon steel alloy and having an about 5 μm nickel-plated surface can be used.

<Electroconductive Layer>
<Resin Having at Least One of Structures Represented by Formulas (1) and (2)>

The electroconductive layer includes a resin having at least one of a structure represented by the following formula (1) and a structure represented by the following formula (2) in the molecule, and an anion.

wherein, in the formula (1), $R_{11}$ represents an alkylene group; $R_{12}$ and $R_{13}$ each independently represent an alkylene group or an alkylene oxide group; A1 represents a methine group or a nitrogen atom; and $X_1$ represents a quaternary ammonium cation structure; and in the formula (2), $R_{21}$ represents an alkylene group; $R_{22}$ represents an alkylene group or an alkylene oxide group; and $X_2$ represents a quaternary ammonium cation structure.

The resin having at least one of the structure represented by the formula (1) and the structure represented by the formula (2) (hereinafter also referred to as a partial structure) (hereinafter also referred to as an ion conductive resin) attains high conductivity even under a low temperature and low humidity environment and reduces changes in the conductivity caused by changes in the temperature and the humidity. To obtain such effects, preferably, the side chain of the resin has flexibility to enhance the mobility of the quaternary ammonium salt, and the side chain has hydrophobicity.

For these reasons above, an alkylene group is selected for $R_{11}$ and $R_{21}$ that connect the quaternary ammonium salt to the main chain of the partial structure. More preferably, $R_{11}$ and $R_{21}$ are an alkylene group having 1 or more and 9 or less carbon atoms. An alkylene group having carbon atoms in this range provides the side chain of the partial structure having good flexibility and hydrophobicity, and attains good miscibility of the raw material quaternary ammonium salt with the raw material polyisocyanate. For these reasons, the partial structure according to the present invention is readily produced, and the bleeding of the ionic conductive agent is further suppressed.

Desirably, the main chain of the partial structure has a structure resistant against hydrolysis considering use of the charging roller under a high temperature and high humidity environment. For these reasons above, an alkylene group or an alkylene oxide group is selected for $R_{12}$, $R_{13}$, and $R_{22}$. An alkylene group having 1 or more and 6 or less carbon atoms is more preferable. For an alkylene group having carbon atoms in this range, the main chain of the partial structure itself has hydrophobicity. As a result, the moisture content in the vicinity of the quaternary ammonium salt reduces under a higher temperature and higher humidity environment to suppress a reduction in resistance. The alkylene group reduces the polarity of the raw material quaternary ammonium salt to enhance the miscibility with the raw material polyisocyanate. As a result, the partial structure according to the present invention is readily produced, and the bleeding of the ionic conductive agent is suppressed. A methine group or a nitrogen atom is selected for A1 that connects the side chain to the main chain because the methine group facilitates the synthesis. A hydrophobic methine group is more preferable considering the influences by the moisture content under a high temperature and high humidity environment.

A quaternary ammonium cation is selected for an ion exchange group fixed to the side chain of the partial structure from the viewpoint of conductivity. When the quaternary ammonium cation is fixed to the side chain of the partial structure, a carrier ion to realize ionic conduction is an anion. The anion has a high ionic transport number (readily moves), and therefore has a lower resistance than in the case where the carrier ion is a cation. The reason is described as follows.

The cation is coordinated with a polar group present in the binder resin (binder component) such as an alkylene oxide. The cation moves in corporation with the segmental motion of the binder resin. Meanwhile, the anion has a weak interaction with a high molecular chain that forms the binder resin, and the movement of the anion is barely influenced by the binder resin.

In the present invention, the quaternary ammonium cation is selected as the cation because the quaternary ammonium salt has a wider range of selection of counteranions, and has high conductivity, easiness in the synthesis, and high miscibility with the binder resin. More preferable structures for the quaternary ammonium cation are the following two structures:

(3)

(4)

wherein $R_{31}$ to $R_{33}$ each independently represent an alkyl group having 1 or more and 6 or less carbon atoms; $R_{41}$ represents an alkyl group having 1 or more and 6 or less carbon atoms; A2 represents a methylene group or an oxygen atom; and n represents 1 or 2. Such a quaternary ammonium cation structure has little steric hindrance, and is readily coordinated with a functional group such as an alkylene oxide or a polar group. Such a structure reduces the density of positive charge on a nitrogen atom to promote ion dissociation to reduce resistance.

The resin according to the present invention can be produced, for example, by the following method using (A) a polyol compound, (B) a polyisocyanate compound, and (C) at least one of a quaternary ammonium salt represented by the formula (5) and a quaternary ammonium salt represented by the formula (6).

(A) Polyol Compound

A polyol compound is selected from known polyol compounds usually used in the electrophotographic member. Specifically, polyether polyol, polyester polyol, and polycarbonate polyol can be used, for example. More preferably, the polyol compound is polyether polyol having an alkylene oxide structure that can reduce the electric resistance value under a low temperature and low humidity environment. Examples of the alkylene oxide structure specifically include ethylene oxide, propylene oxide, butylene oxide, and α-olefin oxide. These can be used alone or in combination when necessary. From the viewpoint of ion dissociation, the alkylene oxides above, particularly ethylene oxide can attain a low resistance under a low temperature and low humidity environment.

(B) Polyisocyanate Compound

A polyisocyanate compound is selected from known polyisocyanate compounds usually used. Specifically, toluene diisocyanate (TDI), diphenylmethane diisocyanate (MDI), hydrogenated MDI, xylylene diisocyanate (XDI), hexamethylene diisocyanate (HDI), and isophorone diisocyanate (IPDI) can be used, for example.

(C) Quaternary Ammonium Salt Represented by Formula (5) and Quaternary Ammonium Salt Represented by Formula (6)

(5)

(6)

wherein, in the formula (5), $R_{51}$ represents an alkylene group; $R_{52}$ and $R_{53}$ each independently represent an alkylene group or an alkylene oxide group; A3 represents a methine group or a nitrogen atom; $X_3$ represents a quaternary ammonium cation structure; and $Y_1$ represents an anion; and in the formula (6), $R_{61}$ represents an alkylene group; $R_{62}$ represents an alkylene group or an alkylene oxide group; $X_4$ represents a quaternary ammonium cation structure; and $Y_2$ represents an anion.

The amount of the quaternary ammonium salt represented by the formula (5) or the quaternary ammonium salt represented by the formula (6) according to the present invention to be added can be properly selected. Preferably, 0.01 parts by mass or more and 20 parts by mass or less of the compound represented by the formula (5) or the formula (6) is blended based on 100 parts by mass of the raw material for preparing the binder resin. At a blending amount of 0.01 parts by mass or more, a conductivity giving effect of the conductive agent added can be attained. At a blending amount of 20 parts by mass or less, the environmental dependency of the electric resistance can be reduced.

<Anion>

Examples of the anion include halogen ions such as fluorine, chlorine ion, bromine ion, and iodine ion; perchloric acid ions, sulfonic acid compound ions, phosphoric acid compound ions, boric acid compound ions, and perfluorosulfonylimide ions.

Among these ions, perfluorosulfonylimide ions are preferable. The perfluorosulfonylimide ions are suitable because these have conductivity higher than those of other anions, and can exhibit higher conductivity under a low temperature and low humidity environment. In addition, because of their high hydrophobicity, the perfluorosulfonylimide ions exhibit high affinity with the raw material for preparing the binder resin according to the present invention, and the affinity is higher than that of typical ions having high hydrophilicity. As a result, the perfluorosulfonylimide ions are uniformly dispersed and reacted with the raw material for preparing the binder resin to be fixed, further reducing the unevenness of the electric resistance attributed to uneven dispersion of the raw materials.

Examples of the perfluorosulfonylimide ions specifically include, but not limited to, bis(trifluoromethanesulfonyl)imide, bis(pentafluoromethanesulfonyl)imide, and bis(nonafluorobutanesulfonyl)imide.

The resin having at least one of the structure represented by the formula (1) and the structure represented by the formula (2) is prepared by reacting the two hydroxy groups of the compound (5) or compound (6) with the polyisocyanate.

It can be found, for example, by an analysis using pyrolysis GC/MS, FT-IR, or NMR that the resin included in the electrophotographic member according to the present invention has the structure represented by the formula (1) or the structure represented by the formula (2).

Besides, examples of standard compounding agents include low molecular polyols as a chain extender, a cross-linking agent, a pigment, and a flame retardant, and catalysts made of amines and tin complexes.

In the present invention, the ratio of the number of the isocyanate group to the number of the hydroxy group in the raw material for preparing the resin having at least one of the structure represented by the formula (1) and the structure represented by the formula (2) (hereinafter also expressed as the "ratio NCO/OH") is preferably 0.95 to 2.0. At a ratio NCO/OH of 0.95 to 2.0, the polyol is reacted and firmly crosslinked with the compound represented by the formula (5) or the formula (6) to suppress the bleeding of the unreacted component and low molecular weight polyurethane. The ratio NCO/OH is more preferably 1.0 to 1.6. At a ratio NCO/OH of 1.0 to 1.6, the bleeding is further suppressed while conductivity is attained under a low temperature and low humidity to reduce changes in the resistance value according to the environment.

When the ion conductive resin used in the electrophotographic member according to the present invention is used as the elastic layer 12 or an intermediate layer disposed between the elastic layer 12 and the surface layer 13, the surface layer 13 can be prepared using a known resin in the field of the electrophotographic conductive member. Specifically, examples of the resin include acrylic resins, polyurethane resins, polyamide resins, polyester resins, polyolefin resins, and silicone resins. The resin that forms the surface layer can contain carbon black, graphite, and oxides having conductivity such as tin oxide, a metal such as copper and silver, conductive particles having conductivity attributed to oxide- or metal surfaces of the particles, and an ionic conductive agent having ion exchange performance such as quaternary ammonium salts when necessary.

The electroconductive resin layer (elastic layer 12) can be prepared using a rubber material or a resin material, for example.

The rubber material is not particularly limited, and any known rubber in the field of the electrophotographic conductive member can be used. Specifically, examples of the rubber material include epichlorohydrin homopolymers, epichlorohydrin-ethylene oxide copolymers, epichlorohydrin-ethylene oxide-allylglycidyl ether terpolymers, acrylonitrile-butadiene copolymers, hydrogenated acrylonitrile-butadiene copolymers, silicone rubbers, acrylic rubbers, and urethane rubbers.

For the resin material, any known resin in the field of the electrophotographic conductive member can be used. Specifically, examples of the resin material include acrylic resins, polyurethane resins, polyamide resins, polyester resins, polyolefin resins, epoxy resins, and silicone resins.

To adjust the electric resistance value, the rubber that forms the electroconductive resin layer may contain electron-conductive carbon black, graphite, and oxides such as tin oxide, a metal such as copper and silver, conductive particles having conductivity attributed to oxide- or metal surfaces of the particles, or an ionic conductive agent having ion exchange performance such as ionic conductive quaternary ammonium salts and sulfonic acid salts when necessary. Typical resin compounding agents such as a filler, a softening agent, a processing aid, a tackifier, an antitack agent, a dispersant, a foaming agent, and a coarse particle can be added in the range in which the effects of the present invention are not impaired. Preferably, the electroconductive resin layer according to the present invention has an electric resistance value so as not to inhibit the resistance in the range of the present invention.

<Conductive Roller>

The electrophotographic member according to the present invention can be suitably used, for example, as a charging roller (conductive roller) brought into contact with the electrophotographic photosensitive member to charge the electrophotographic photosensitive member.

The electrophotographic member according to the present invention can be suitably used as the charging roller in a process cartridge configured to be detachable to the main body of the electrophotographic apparatus and including an electrophotographic photosensitive member and the charging roller brought into contact with the electrophotographic photosensitive member to charge the electrophotographic photosensitive member by a voltage applied.

The electrophotographic member according to the present invention can be used not only as the charging member such as the charging roller but also as a developing member such as a developing roller, a transfer member such as a transfer roller, a discharging member, and a transporting member such as a paper feeding roller.

Preferably, the respective layers in the electrophotographic member according to the present invention have an electric resistance value so as not to inhibit the resistance in the range of the present invention.

<Process Cartridge>

Figure 2:
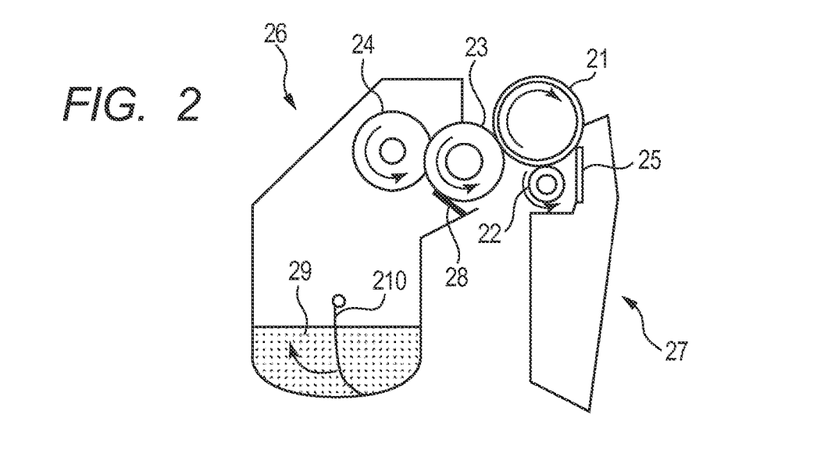
FIG. 2 is a diagram illustrating a process cartridge according to the present invention.

FIG. 2 is a schematic cross sectional view illustrating the process cartridge according to the present invention.

The process cartridge includes at least one of the developing apparatus and the charging apparatus. The developing apparatus includes at least a developing roller 23 and a toner container 26 integrated with the developing roller 23, and may include a toner feeding roller 24, a toner 29, a developing blade 28, and a stirring blade 210 when necessary. The charging apparatus includes at least an electrophotographic photosensitive member 21, a cleaning blade 25, and a charging roller 22 which are integrated into one, and may include a waste toner container 27. Voltages are applied to the charging roller 22, the developing roller 23, the toner feeding roller 24, and the developing blade 28, respectively.

<Electrophotographic Apparatus>

Figure 3:
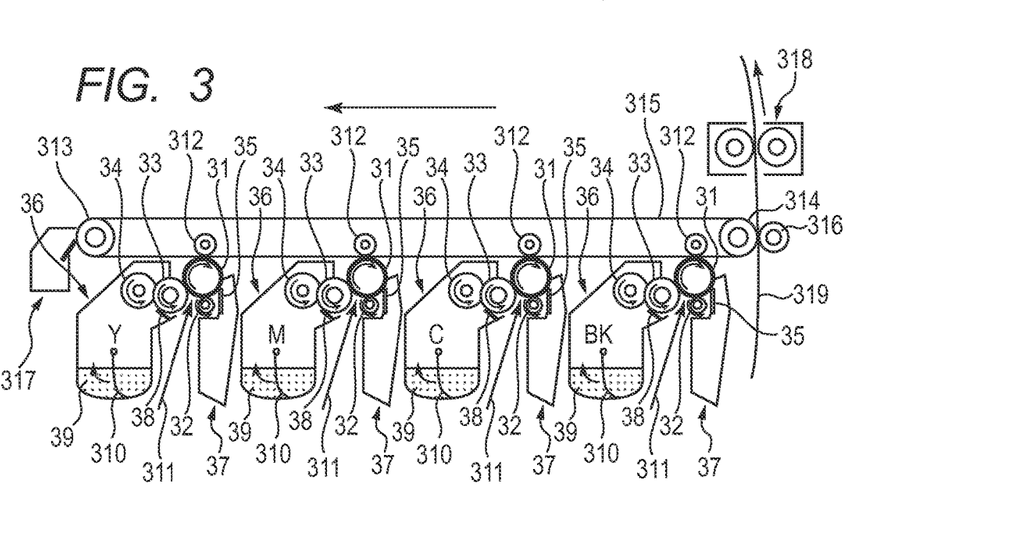
FIG. 3 is a diagram illustrating an electrophotographic apparatus according to the present invention.

FIG. 3 is a schematic block diagram illustrating the electrophotographic apparatus according to the present invention. The electrophotographic apparatus includes the process cartridges illustrated in FIG. 2 for the toners of black, magenta, yellow, and cyan, for example. The cartridges are mounted detachable to this color image forming apparatus.

A charging roller 32 is disposed facing the electrophotographic photosensitive member 31 to charge an electrophotographic photosensitive member 31 (hereinafter also simply expressed as the "photosensitive member 31"). The photosensitive member 31 rotates in the arrow direction, and is uniformly charged by the charging roller 32 to which a voltage is charged from the charge bias power supply. An electrostatic latent image is formed on the surface of the photosensitive member 31 with exposure light 311. A toner 39 accommodated in a toner container 36 is fed to a toner feeding roller 34 by a stirring blade 310, and transported onto a developing roller 33. The toner 39 is uniformly applied to the surface of the developing roller 33 by a developing blade 38 disposed in contact with the developing roller 33, and is charged by friction charging. The toner is applied by the developing roller 33 disposed in contact with the photosensitive member 31 to develop an electrostatic latent image to be visualized as a toner image.

The visualized toner image on the photosensitive member is transferred onto an intermediate transfer belt 315 by a primary transfer roller 312 to which a voltage is applied by a primary transfer bias power supply not shown. The toner images of the respective colors are sequentially superimposed to form a color image on the intermediate transfer belt.

A transfer material 319 is fed into the apparatus by a paper feeding roller not shown, and conveyed between the intermediate transfer belt 315 and a secondary transfer roller 316. A voltage is applied to the secondary transfer roller 316 from a secondary transfer bias power supply not shown, and the color image on the intermediate transfer belt 315 is transferred onto the transfer material 319. The transfer material 319 having the transferred color image is fixed by a fixing unit 318, and discharged to the outside of the apparatus. The print operation is terminated.

The non-transferred toner remaining on the photosensitive member is scraped with a cleaning blade 35, and is accommodated in a waste toner accommodating container 37. The cleaned photosensitive member 31 repeatedly operates in the steps above. The non-transferred toner remaining on a primary transfer belt is also scraped with a cleaning apparatus 317.

EXAMPLES

Hereinafter, the present invention will be described more in detail using Examples.

<1. Preparation of Unvulcanized Rubber Composition>

The materials at the blending amounts shown in Table 1 below were mixed with an increased pressure kneader to prepare Kneaded rubber composition A. Further, 166 parts by mass of Kneaded rubber composition A was mixed with the materials at the blending amounts shown in Table 2 below with an open roll mill to prepare an unvulcanized rubber composition.

TABLE 1

| | Material | Blending amount (part(s) by mass) |
|---|---|---|
| Raw material rubber | NBR (trade name: Nipol DN219 made by ZEON Corporation) | 100 |
| Conductive agent | Carbon black (trade name: TOKABLACK #7360SB made by Tokai Carbon Co., Ltd.) | 40 |
| Filler | Calcium carbonate (trade name: NANOX #30 made by Maruo Calcium Co., Ltd.) | 20 |
| Vulcanization accelerating aid | Zinc oxide | 5 |
| Processing aid | Stearic acid | 1 |

TABLE 2

| | Material | Blending amount (parts by mass) |
|---|---|---|
| Crosslinking agent | Sulfur | 1.2 |
| Vulcanization accelerator | Tetrabenzylthiuram disulfide (trade name: TBZTD made by Sanshin Chemical Industry Co., Ltd.) | 4.5 |

<2. Preparation of Mandrel and Elastic Layer>

A free cutting steel rod was subjected to electroless nickel plating to prepare a rod having a length of 252 mm and an outer diameter of 6 mm. Next, an adhesive was applied across the entire circumference of the rod excluding both end regions extending at a width of 11 mm from both ends of the rod. That is, the applied region of the circumference had a length of 230 mm. A conductive hot-melt adhesive was used. The adhesive was applied with a roll coater. In Examples, the rod to which the adhesive was applied was used as an electroconductive mandrel.

Next, a crosshead extruder including a mechanism to feed an electroconductive mandrel and a mechanism to discharge an unvulcanized rubber roller was prepared. A die having an inner diameter of 12.5 mm was mounted on the crosshead. The temperatures of the extruder and the crosshead were adjusted at 80° C., and the conveying rate of the electroconductive mandrel was adjusted at 60 mm/sec. Under these conditions, the unvulcanized rubber composition was fed from the extruder. The unvulcanized rubber composition prepared in <1. Preparation of unvulcanized rubber composition> was applied to the electroconductive mandrel inside of the crosshead to produce an unvulcanized rubber roller. Next, the unvulcanized rubber roller was placed in a 170° C. hot air vulcanizing furnace, and was heated for 60 minutes to cure the unvulcanized rubber. Thus, an elastic layer was prepared. Subsequently, ends of the elastic layer were cut and removed. Finally, the surface of the elastic layer was polished with a rotary grinding wheel. Thereby, Rubber roller 1 including the elastic layer was produced. The diameter at a position located 90 mm from the central portion toward each end of Rubber roller 1 was 8.4 mm, and the central portion diameter of Rubber roller 1 was 8.5 mm.

<3. Synthesis of Quaternary Ammonium Salt>

[3-1 Synthesis of Quaternary Ammonium Salt Represented by Formula (6)]

<Quaternary Ammonium Salt 1>

After 1.10 g (10 mmol) of 3-chloro-1,2-propanediol as a quaternizing agent was dissolved in 10 ml of anhydrous ethanol, 1.22 g (15 mmol) of trimethylamine as a tertiary amine was added at room temperature, and the solution was stirred for 24 hours at room temperature. Subsequently, the solvent was evaporated under reduced pressure. The condensed product was washed with 10 ml of hexane, and the supernatant solution was removed by decantation. After the operation was repeated twice, the product wad dried at reduced pressure to obtain a residue. The residue of anion was chloride ion.

For anion exchange, the residue was dissolved/suspended in a mixed solvent of 5 ml acetonitrile. As an anion exchange salt, 2.87 g (10 mmol) of lithium bis(trifluoromethanesulfonyl)imide was then added, and the mixture was stirred for 24 hours. The solvent was then evaporated under reduced pressure. The residue was extracted with 10 ml of methyl isobutyl ketone, and filtered. The methyl isobutyl ketone in the filtrate was evaporated under reduced pressure to prepare Quaternary ammonium salt 1 including bis(trifluoromethanesulfonyl)imide ion (TFSI) as the anion. The structure of the synthesized quaternary ammonium salt represented by the formula (6) is shown in Table 7.

<Quaternary Ammonium Salts 2 to 5>

Quaternary ammonium salts 2 to 5 were synthesized as Quaternary ammonium salt 1 except that the tertiary amine was changed as shown in Table 3. The structure of the synthesized quaternary ammonium salt represented by the formula (6) is shown in Table 7.

TABLE 3

| Quaternary ammonium salt | Tertiary amine |
| --- | --- |
| 2 | Trihexylamine |
| 3 | 4-Methylmorpholine |
| 4 | 1-Ethylpyrrolidine |
| 5 | N,N-Dimethyltetradecylamine |

<Quaternary Ammonium Salt 6>

1.63 g (10 mmol) of 6-bromo-1-hexene as a halide was dissolved in 10 ml of dichloromethane. While the temperature was kept at 10° C., 8.62 g (15 mmol) of an aqueous solution of 30% by mass m-chloroperoxybenzoic acid was added dropwise, and the mixture was stirred. After the reaction, sodium thiosulfate wad added to decompose excessive peroxide. The product was then washed with 8% by mass sodium hydrogen carbonate and water sequentially, and an organic layer was condensed to produce an epoxy compound. The epoxy compound was added to 50 ml of 1 N hydrochloric acid, and the mixture was stirred for 24 hours. Methyl ethyl ketone was added, and the organic layer was extracted.

The solvent was evaporated under reduced pressure from the organic layer. The condensed product was dissolved in anhydrous ethanol, and 1.21 g (12 mmol) of triethylamine as a tertiary amine was added at room temperature. The mixture was stirred for 24 hours. Subsequently, the solvent was evaporated under reduced pressure. The condensed product was washed with 10 ml of hexane, and the supernatant solution was removed by decantation. After the operation was repeated twice, the product was dried at reduced pressure to obtain a residue. The residue was dissolved/suspended in a mixed solvent of 5 ml acetonitrile. As an anion exchange salt, 2.87 g (10 mmol) of lithium bis(trifluoromethanesulfonyl)imide was added, and the mixture was stirred for 24 hours. The solvent was then evaporated under reduced pressure.

The residue was extracted with 10 ml of methyl isobutyl ketone, and filtered. The methyl isobutyl ketone in the filtrate was evaporated under reduced pressure to prepare Quaternary ammonium salt 6 including bis(trifluoromethanesulfonyl)imide ion (TFSI) as the anion.

<Quaternary Ammonium Salts 7 and 8>

Quaternary ammonium salts 7 and 8 were synthesized as Quaternary ammonium salt 5 except that the halide and the tertiary amine were changed as shown in Table 4. The structure of the synthesized quaternary ammonium salt represented by the formula (6) is shown in Table 7.

TABLE 4

| Quaternary ammonium salt | Halide | Tertiary amine |
| --- | --- | --- |
| 7 | 11-Bromo-undecene | Trimethylamine |
| 8 | 11-Bromo-undecene | 4-Methylmorpholine |

<Quaternary Ammonium Salt 9>

1.14 g (10 mmol) of 1,5-hexadiene diepoxide as an epoxy compound was dissolved in 10 ml of anhydrous ethanol, and 0.73 g (10 mmol) of diethylamine as a secondary amine was added. The mixture was stirred for 12 hours.

Subsequently, 0.4 g (10.5 mmol) of sodium borohydride dissolved in 10 ml of anhydrous ethanol was added dropwise, and the mixture was stirred. After the reaction, diluted hydrochloric acid was added to decompose excessive sodium borohydride. Ethyl acetate was then added to the product, and the product was washed with 8% by mass sodium hydrogen carbonate and water sequentially. The organic layer was recovered, and condensed.

The condensed product was dissolved in anhydrous ethanol, and 1.41 g (10 mmol) of iodomethane as the quaternizing agent was added at room temperature. The mixture was stirred for 24 hours. Subsequently, the solvent was evaporated under reduced pressure. The condensed product was washed with 10 ml of hexane, and the supernatant solution was removed by decantation. After the operation was repeated twice, the product was dried at reduced pressure to obtain a residue. The residue was dissolved/suspended in a mixed solvent of 5 ml acetonitrile. As an anion exchange salt, 2.87 g (10 mmol) of lithium bis(trifluoromethanesulfonyl)imide was then added, and the mixture was stirred for 24 hours. The solvent was then evaporated under reduced pressure.

The residue was extracted with 10 ml of methyl isobutyl ketone, and filtered. The methyl isobutyl ketone in the filtrate was evaporated under reduced pressure to prepare Quaternary ammonium salt 9 including bis(trifluoromethanesulfonyl)imide ion (TFSI) as the anion. The structure of the synthesized quaternary ammonium salt represented by the formula (6) is shown in Table 7.

<Quaternary Ammonium Salts 10 and 11>

Quaternary ammonium salts 10 and 11 were synthesized as Quaternary ammonium salt 9 except that the epoxy compound and the secondary amine were changed as shown in Table 5. The structure of the synthesized quaternary ammonium salt represented by the formula (6) is shown in Tables 7 and 8.

TABLE 5

| Quaternary ammonium salt | Epoxy compound | Secondary amine |
| --- | --- | --- |
| 10 | 1,7-Octadiene diepoxide | Diethylamine |
| 11 | 1,7-Octadiene diepoxide | Morpholine |

<Quaternary Ammonium Salt 12>

Quaternary ammonium salt 12 was synthesized as Quaternary ammonium salt 1 except that anion exchange was not performed. The anion was chloride ion. The structure of the synthesized quaternary ammonium salt represented by the formula (6) is shown in Table 8.

<Quaternary Ammonium Salt 13>

Quaternary ammonium salt 13 was synthesized as Quaternary ammonium salt 1 except that that the quaternizing agent was replaced by 3-bromo-1,2-propanediol and anion exchange was not performed. The anion was bromide ion. The structure of the synthesized quaternary ammonium salt represented by the formula (6) is shown in Table 8.

<Quaternary Ammonium Salt 14>

Quaternary ammonium salt 14 was synthesized as Quaternary ammonium salt 1 except that the anion exchange salt was replaced by lithium perchlorate. The anion was perchloric acid ion. The structure of the synthesized quaternary ammonium salt represented by the formula (6) is shown in Table 8.

<Quaternary Ammonium Salts 15 and 16>

Quaternary ammonium salts 15 and 16 were synthesized as Quaternary ammonium salt 1 except that the anion exchange salt was changed as shown in Table 6. The structure of the synthesized quaternary ammonium salt represented by the formula (6) is shown in Table 8.

TABLE 6

| Quaternary ammonium salt | Anion exchange salt |
|---|---|
| 15 | Lithium bis(nonafluorobutanesulfonyl)imide (anion abbreviated to NFSI) |
| 16 | Lithium cyclo-hexafluoropropane-1,3-bis(sulfonyl)imide (anion abbreviated to CFSI) |

<Quaternary Ammonium Salt 17>

1.5 g (10 mmol) of glycidyl trimethylammonium chloride was dissolved in 5 ml of purified water. 2.87 g (10 mmol) of lithium bis(trifluoromethanesulfonyl)imide as an anion exchange salt dissolved in 5 ml of purified water was added, and the mixture was stirred for 2 hours. After the mixing and stirring, the oil layer (lower layer) was recovered with a separating funnel, and washed twice with purified water. The anion of glycidyl trimethylammonium was exchanged for bis(trifluoromethanesulfonyl)imide.

Next, 0.48 g (1.2 mmol) of 60% by mass sodium hydride was washed with hexane, and hexane was removed. 5 g of tetrahydrofuran was then added. 4 g (10 mmol) of polypropylene glycol having a molecular weight of 400 (trade name: EXCENOL 420 made by ASAHI GLASS CO., LTD.) dissolved in 5 g of anhydrous tetrahydrofuran was added dropwise, and stirred. Subsequently, 3.96 g (10 mmol) of the bis(trifluoromethanesulfonyl)imide salt of glycidyl trimethylammonium synthesized above was added dropwise, and stirred at 0° C.

After the reaction, ethanol wad added to decompose excessive sodium hydride. The product was neutralized with diluted hydrochloric acid. The solvent was then evaporated under reduced pressure. Subsequently, methyl ethyl ketone and purified water were added, and the organic layer was extracted with a separating funnel. The methyl ethyl ketone in the extracted organic layer was evaporated under reduced pressure to prepare Quaternary ammonium salt 17. The structure of the synthesized quaternary ammonium salt represented by the formula (6) is shown in Table 8.

TABLE 7

| | Quaternary ammonium salt | | | | | | | | | |
|---|---|---|---|---|---|---|---|---|---|---|
| | 1 | 2 | 3 | 4 | 5 | 6 | 7 | 8 | 9 | 10 |
| $R_{61}$ | $CH_2$ | $CH_2$ | $CH_2$ | $CH_2$ | $CH_2$ | $C_4H_8$ | $C_9H_{18}$ | $C_9H_{18}$ | $CH_2$ | $CH_2$ |
| $R_{62}$ | $CH_2$ | $CH_2$ | $CH_2$ | $CH_2$ | $CH_2$ | $CH_2$ | $CH_2$ | $CH_2$ | $C_4H_8$ | $C_4H_8$ |
| Cation structure | (3) | (3) | (4) | (4) | (3) | (3) | (3) | (4) | (3) | (4) |
| $R_{31}$ | Me | $C_6H_{13}$ | — | — | Me | Et | Me | — | Et | — |
| $R_{32}$ | Me | $C_6H_{13}$ | — | — | Me | Et | Me | — | Et | — |
| $R_{33}$ | Me | $C_6H_{13}$ | — | — | $C_{13}H_{29}$ | Et | Me | — | Me | — |
| $R_{41}$ | — | — | Me | Et | — | — | — | Me | — | Me |
| n | — | — | 2 | 1 | — | — | — | 2 | — | 2 |
| A2 | — | — | O | $CH_2$ | — | — | — | O | — | $CH_2$ |
| Anion | TFSI | TFSI | TFSI | TFSI | TFSI | TFSI | TFSI | TFSI | TFSI | TFSI |

TABLE 8

| | Quaternary ammonium salt | | | | | | |
|---|---|---|---|---|---|---|---|
| | 11 | 12 | 13 | 14 | 15 | 16 | 17 |
| $R_{61}$ | $CH_2$ | $CH_2$ | $CH_2$ | $CH_2$ | $CH_2$ | $CH_2$ | $CH_2$ |
| $R_{62}$ | $C_6H_{12}$ | $CH_2$ | $CH_2$ | $CH_2$ | $CH_2$ | $CH_2$ | PO |
| Cation structure | (4) | (3) | (3) | (3) | (3) | (3) | (3) |
| $R_{31}$ | — | Me | Me | Me | Me | Me | Me |
| $R_{32}$ | — | Me | Me | Me | Me | Me | Me |
| $R_{33}$ | — | Me | Me | Me | Me | Me | Me |
| $R_{41}$ | Me | — | — | — | — | — | — |
| A2 | 2 | — | — | — | — | — | — |
| n | O | — | — | — | — | — | — |
| Anion | TFSI | Cl⁻ | Br⁻ | $ClO_4^-$ | NFSI | CFSI | TFSI |

In Tables 7 and 8, Me represents a methyl group, and Et represents an ethyl group. In Table 8, PO represents a polypropylene oxide structure.

[3-2 Synthesis of Quaternary Ammonium Salt Represented by Formula (5)]

<Quaternary Ammonium Salt 18>

As the amine, 25 g (154 mmol) of N-(3-aminopropyl)diethanolamine was dissolved in 75 ml of ethanol. Next, while the solution was being cooled with an ice bath, 70.9 g (1.514 mol) of 80% by mass formic acid as a reducing agent and 65.6 g (807 mmol) of 37% by mass formaldehyde aqueous solution as a tertiarizing agent were added dropwise. After the dropwise addition, the solution was heated under reflux while being stirred for 5 hours. The reaction solution was cooled to room temperature, and ethanol and excessive formic acid and formaldehyde were evaporated under reduced pressure. 200 ml of an aqueous solution of 10% by mass sodium hydroxide was added to the condensed solution, and the solution was then separated with 100 ml of ethyl acetate three times. The ethyl acetate in the obtained organic layer was evaporated under reduced pressure.

According to the operation above, the raw material tertiary amine was synthesized.

After 1.42 g (10 mmol) of iodomethane as the quaternizing agent was dissolved in 10 ml of anhydrous ethanol, 1.90 g (10 mmol) of the tertiary amine was added at room temperature, and the solution was stirred for 24 hours at room temperature. The solvent was then evaporated under reduced pressure. The condensed product was washed with 10 ml of hexane, and the supernatant solution was removed by decantation. After the operation was repeated twice, the product was dried at reduced pressure to obtain a residue. The residue was dissolved/suspended in a mixed solvent of 5 ml acetonitrile. As an anion exchange salt, 2.87 g (10 mmol) of lithium bis(trifluoromethanesulfonyl)imide was then added, and the mixture was stirred for 24 hours. The solvent was then evaporated under reduced pressure.

The residue was extracted with 10 ml of methyl isobutyl ketone, and filtered. The methyl isobutyl ketone in the filtrate was evaporated under reduced pressure to prepare Quaternary ammonium salt 11 including bis(trifluoromethanesulfonyl)imide ion (TFSI) as the anion. The structure of the synthesized quaternary ammonium salt represented by the formula (5) is shown in Table 9.

<Quaternary Ammonium Salt 19>

After 0.96 g (2.4 mmol) of 60% by mass sodium hydride was washed with hexane, hexane was removed, and 5 g of tetrahydrofuran was added. 1.90 g (10 mmol) of the tertiary amine, which was the raw material for Quaternary ammonium salt 18 and was dissolved in 5 ml tetrahydrofuran, was added dropwise, and the solution was stirred. Subsequently, 4.64 g (80 mmol) of propylene oxide was added dropwise at 0° C., and the solution was stirred for 3 hours.

After the reaction, ethanol was added to decompose excessive sodium hydride, the solution was neutralized with diluted hydrochloric acid. The solvent was then evaporated under reduced pressure. Subsequently, methyl ethyl ketone and purified water were added, and the organic layer was extracted with a separating funnel. The methyl ethyl ketone in the organic layer was evaporated under reduced pressure. 10 ml of ethanol and 1.41 g (10 mmol) of iodomethane as the quaternizing agent were then added at room temperature, and the solution was stirred for 24 hours. The solvent was then evaporated under reduced pressure. The condensed product was washed with 10 ml of hexane, and the supernatant solution was removed by decantation.

After the operation was repeated twice, the product was dried at reduced pressure to obtain a residue. The residue was dissolved/suspended in a mixed solvent of 5 ml acetonitrile. As an anion exchange salt, 2.87 g (10 mmol) of lithium bis(trifluoromethanesulfonyl)imide was added, and the mixture was stirred for 2 hours. The solvent was then evaporated under reduced pressure. The residue was extracted with 10 ml of methyl isobutyl ketone, and filtered. The methyl isobutyl ketone in the filtrate was evaporated under reduced pressure to prepare Quaternary ammonium salt 19 containing bis(trifluoromethanesulfonyl)imide ion (TFSI) as the anion. The structure of the synthesized quaternary ammonium salt represented by the formula (5) is shown in Table 9.

<Quaternary Ammonium Salt 20>

1.00 g (10 mmol) of acetylacetone and 1.55 g (12 mmol) of N,N-diisopropylethylamine were added to 5 ml of anhydrous ethanol. Subsequently, 2.89 g (10 mmol) of (5-bromopentyl)trimethylammonium bromide dissolved in 5 ml of anhydrous ethanol was added, and the solution was stirred at room temperature for 24 hours. 1.14 g (30 mmol) of sodium borohydride dissolved in anhydrous ethanol was added dropwise into the reaction solution, and the reaction solution was stirred for 3 hours.

After the reaction, diluted hydrochloric acid was added to decompose excessive sodium borohydride. Ethyl acetate was then added, and the reaction product was washed with 8% by mass sodium hydrogen carbonate and water sequentially. The organic layer was recovered, and condensed. The residue was dissolved/suspended in a mixed solvent of 5 ml acetonitrile. As an anion exchange salt, 2.87 g (10 mmol) of lithium bis(trifluoromethanesulfonyl)imide was added, and the solution was stirred for 2 hours. The solvent was then evaporated under reduced pressure. The residue was extracted with 10 ml of methyl isobutyl ketone, and filtered. The methyl isobutyl ketone in the filtrate was evaporated under reduced pressure to prepare Quaternary ammonium salt 20. The structure of the synthesized quaternary ammonium salt represented by the formula (5) is shown in Table 9.

TABLE 9

| | Quaternary ammonium salt | | |
|---|---|---|---|
| | 18 | 19 | 20 |
| $R_{51}$ | $C_3H_6$ | $C_3H_6$ | $C_5H_{10}$ |
| $R_{52}$ | $C_2H_4$ | (HO)—PO—$C_2H_4$—(A3) | $CH_2$ |
| $R_{53}$ | $C_2H_4$ | (HO)—PO—$C_2H_4$—(A3) | $CH_2$ |
| A3 | N | N | CH |
| Cation structure | $N^+(Me)_3$ | $N^+(Me)_3$ | $N^+(Me)_3$ |
| Anion | TFSI | TFSI | TFSI |

(HO)—PO—$C_2H_4$-(A3) in Quaternary ammonium salt 19 expresses that $C_2H_4$ bonds to A3 and the other terminal of —PO—$C_2H_4$— bonds to a hydroxy group. Me represents a methyl group, and PO represents a polypropylene oxide structure.

<4. Preparation of Coating Solution for Forming a Surface Layer>

(Synthesis of Isocyanate Group-Terminated Prepolymer)

Under a nitrogen atmosphere, 100 parts by mass of a polypropylene glycol having a molecular weight of 3000 and including propylene oxide added to glycerol (trade name: EXCENOL 2040 made by ASAHI GLASS CO., LTD.) was gradually added dropwise into 27 parts by mass of a polymeric MDI (trade name: Millionate MR200 made by Nippon Polyurethane Industry Co., Ltd.) in a reaction container while the inner temperature of the reaction container was kept at 65° C. After the dropwise addition was completed, the reaction was performed at 65° C. for 2 hours. The reaction mixture was cooled to room temperature to prepare Isocyanate group-terminated prepolymer B-1 having 3.31% of an isocyanate group.

(Preparation of Coating Solution 1)

As materials for the surface layer, 100 parts by mass of a polyether diol prepared by addition polymerization of polypropylene glycol and ethylene oxide and having a molecular weight of 3000 (trade name: Adeka polyether PR-3007) and 2 parts by mass of Quaternary ammonium salt 1 were added to 127 parts by mass of Isocyanate group-terminated prepolymer B-1, and mixed by stirring.

Next, methyl ethyl ketone (hereinafter also expressed as "MEK") was added such that the percentage of the total solid content was 30% by mass, and these were mixed with a sand mill. The viscosity of the solution was then adjusted to 12 cps with MEK to prepare Coating solution 1 for forming a surface layer.

Example 1

Rubber roller 1 produced above including the elastic layer was immersed in Coating solution 1 to form a coating of Coating solution 1 on the surface of the elastic layer in the Rubber roller 1, and the coating was dried. The coating was further heated for one hour in an oven heated to 140° C. to form an approximately 15 μm surface layer on the outer periphery of the elastic layer to produce an electrophotographic member according to Example 1. The produced electrophotographic member was evaluated according to the following evaluation methods. The results of evaluation are shown in Table 20-1.

<Evaluation of Properties of Electrophotographic Member>

[Measurement of Electrical Resistivity of Electroconductive Layer]

The electrical resistivity (film resistance) of the electroconductive layer in the electrophotographic member (surface layer in Examples) was calculated based on the measurement of an AC impedance by a four-terminal method. The measurement was performed at a voltage amplitude of 5 mV and a frequency of 1 Hz to 1 MHz.

When the produced electrophotographic member had a plurality of electroconductive layers, the electroconductive layer disposed in the outer periphery of the resin layer meeting the requirements of the present invention (electroconductive layer not containing the ion conductive resin) was peeled off, and the electrical resistivity of the electroconductive layer meeting the requirements of the present invention was measured. The electrical resistivity was measured five times, and the average value of the five measured values was defined as the electrical resistivity in the present invention.

The electrical resistivity was measured under an environment of temperature: 15° C./humidity: 10% RH (hereinafter expressed as "L/L" in some cases) and under an environment of temperature: 30° C./humidity: 80% RH (hereinafter expressed as "H/H" in some cases). To examine the influences by changes in the environment, the logarithm of the ratio of the electrical resistivity under the environment of temperature: 15° C./humidity: 10% RH to the electrical resistivity under the environment of temperature: 30° C./humidity: 80% RH ($\log_{10}${(electrical resistivity under L/L environment)/(electrical resistivity under H/H environment)}) was taken, and defined as an environment change digit. In Examples, the electrophotographic members were left under the respective environments for 48 hours or more before the evaluation. The results of evaluation are shown in Table 20-1.

[Extraction Test]

In the electrophotographic member, the resin was cut out from the electroconductive layer according to the present invention (surface layer in Examples), and was left under an environment of temperature: 25° C./humidity: 50% RH for 48 hours or more. Subsequently, the mass (W1) of the cut-out resin was measured. After the measurement, the resin was immersed in methyl ethyl ketone for 72 hours or more, and stirred to extract the unreacted component contained in the resin. After the extraction, the resin was taken out, and placed in a 80° C. oven for 3 hours or more to volatize the methyl ethyl ketone in the resin. Subsequently, the resin from which the unreacted component was extracted was left under an environment of temperature: 25° C./humidity: 50% RH for 48 hours or more, and a mass (W2) was measured. The extraction rate was calculated from the following expression. The results of evaluation are shown in Table 20-1.

extraction rate={($W1-W2$)/$W1$}×100

[C Set Evaluation Test]

A C set image caused by bleeding was evaluated as described below (the C set the so-called compression set (compression set) which is deformation not easily restored in the contact region between the charging roller and the photosensitive member).

For the test, the produced electrophotographic member as a charging roller was integrated into a process cartridge for an electrophotographic laser printer (trade name: Laserjet CP4525dn made by Hewlett-Packard Company). Next, the process cartridge was left for one month under an environment of a temperature of 40° C./humidity: 95% RH. Subsequently, the process cartridge was left for one day under an environment of a temperature of 23° C./humidity: 50% RH, and integrated into the printer. A halftone image (image in which a horizontal line was drawn at a width of 1 dot and an interval of 2 dots in a direction vertical to the rotational direction of the photosensitive member) was output, and evaluated. The results of evaluation are shown in Table 20-1. The criteria for evaluation of the C set image are as shown in Table 10 below.

TABLE 10

| | |
|---|---|
| A | No horizontal streaks are found in the image. |
| B | Horizontal streaks are slightly found in part of the contact region in the image. |
| C | Horizontal streaks corresponding to the pitch of the charging roller are partially found in the image. |
| D | Horizontal streaks corresponding to the pitch of the charging roller are remarkably found across the image, and the image quality is reduced. |

[Low Temperature and Low Humidity Environment Durability Test of Roller]

In a low temperature and low humidity environment durability test, the produced electrophotographic member as a charging roller was integrated into a process cartridge for an electrophotographic laser printer (trade name: Laserjet CP4525dn made by Hewlett-Packard Company). Next, the process cartridge was left for one week under an environment of temperature: 15° C./humidity: 10% RH. Subsequently, the cartridge was integrated into the printer under the same environment, a horizontal line image having a width of 2 dots and an interval of 176 dots in a direction vertical to the rotational direction of the photosensitive member was output to perform a two-sheet intermittent durability test (durability test in which printing was halted for 3 seconds every time when two sheets were printed).

When the output of 20000 sheets was completed, another halftone image (image in which a horizontal line having a width of 1 dot and an interval of 2 dots was drawn in a direction vertical to the rotational direction of the photosensitive member) was output, and durability was evaluated. For the evaluation, the halftone image was visually observed, and the presence of horizontal streaks produced in the image was determined on the criteria shown in Table 11 below. The results of evaluation are shown in Table 20-1.

TABLE 11

| | |
|---|---|
| A | No horizontal streaks are found in the image. |
| B | Horizontal streaks are slightly found in the image. |
| C | Horizontal streaks corresponding to the pitch of the charging roller are partially found in the image. |
| D | Horizontal streaks are remarkably found across the image, and the image quality is reduced. |

Examples 2 to 17

Quaternary ammonium salt 1 in Coating solution 1 was changed to the quaternary ammonium salt shown in Table 12, and Coating solutions 2 to 17 were prepared. Electrophotographic members were produced as in Example 1 except that Coating solution 1 was changed to Coating solutions 2 to 17, respectively, and were evaluated. The results of evaluation are shown in Tables 20-1 and 20-2.

TABLE 12

| Coating solution | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|
| Quaternary ammonium salt | 2 | 3 | 4 | 5 | 6 | 7 | 8 | 9 | 10 | 11 | 12 | 13 | 14 | 15 | 16 | 17 |

Example 18

An electrophotographic member was produced as in Example 1 except that Coating solution 1 was changed to Coating solution 18 below, and was evaluated. The results of evaluation are shown in Table 20-2.

(Preparation of Coating Solution 18)
(Synthesis of Polyol)

80.4% by mass of ϵ-caprolactone, 19.6% by mass of trimethylolpropane, and titanium tetra-n-butoxide as a catalyst were placed in a glass flask with a stirrer, and reacted under a nitrogen atmosphere at 180° C. for 6 hours to prepare Polyester polyol 1. The hydroxy value was 74.0 mgKOH/g.

TABLE 13

Polyester polyol 1
Polyfunctional isocyanate (trade name: DURANATE 24A100; made by Asahi Kasei Chemicals Corporation)
Bifunctional isocyanate (trade name: DURANATE D101; made by Asahi Kasei Chemicals Corporation)
(Blending ratio of isocyanates 24A100:D101 = 0.38:0.62)

The materials shown in Table 13 were blended at OH:NCO=2:1. The materials were agitatedly stirred at 100° C. for 6 hours to prepare Hydroxyl group-terminated prepolymer A having a hydroxy value of 34.0 mgKOH/g.

(Synthesis of Isocyanate Group-Terminated Prepolymer)

TABLE 14

Polyester polyol 1
Polyfunctional isocyanate (trade name: DURANATE 24A100; made by Asahi Kasei Chemicals Corporation)
Bifunctional isocyanate (trade name: DURANATE D101; made by Asahi Kasei Chemicals Corporation)
(Blending ratio of isocyanates 24A100:D101 = 0.38:0.62)

The materials shown in Table 14 were blended at OH:NCO=1:2. The materials were agitatedly stirred at 100° C. for 6 hours to prepare Isocyanate group-terminated prepolymer A having 4.5% by mass of an isocyanate group.

As the materials for the surface layer, 539.9 parts by mass of Hydroxyl group-terminated prepolymer A and 2.0 parts by mass of Quaternary ammonium salt 1 were added to 366.4 parts by mass of Isocyanate group-terminated prepolymer A, and were mixed by stirring.

Next, methyl ethyl ketone (MEK) was added such that the percentage of the total solid content was 30% by mass, and the solution was mixed with a sand mill. The viscosity was then adjusted to 10 to 13 cps with MEK to prepare Coating solution 18 for forming a surface layer.

Example 19

Coating solution 19 was prepared in the same manner except that Quaternary ammonium salt 1 to be added to Coating solution 18 was changed to Quaternary ammonium salt 7. An electrophotographic member according to Example 19 was produced as in Example 18 except that Coating solution was used instead of Coating solution 18, and was evaluated. The results of evaluation are shown in Table 20-2.

Example 20

The materials shown in Table 15 were mixed with an open roll mill to prepare an unvulcanized rubber composition. Rubber roller 2 including an elastic layer was produced as Rubber roller 1 including the elastic layer except that the unvulcanized rubber composition was used. An electrophotographic member was produced as in Example 1 except that Rubber roller 2 including an elastic layer was used, and was evaluated. The results of evaluation are shown in Table 20-2.

TABLE 15

| | | |
|---|---|---|
| Epichlorohydrin-ethylene oxide-allylglycidyl ether terpolymer (GECO) (trade name: EPICHLOMER CG-102 made by Daiso Co., Ltd.) | 100 | Parts by mass |
| Zinc oxide (two zinc oxides made by Seido Chemical Industry Co., Ltd.) | 5 | Parts by mass |
| Calcium carbonate (trade name: Silver-W made by Shiraishi Calcium Kaisha, Ltd.) | 35 | Parts by mass |
| Carbon black (trade name: SEAST SO made by Tokai Carbon Co., Ltd.) | 0.5 | Parts by mass |
| Stearic acid | 2 | Parts by mass |
| Adipic acid ester (trade name: POLYCIZER W305ELS made by DIC Corporation) | 10 | Parts by mass |
| Sulfur | 0.5 | Parts by mass |
| Dipentamethylenethiuram tetrasulfide (trade name: NOCCELER TRA made by Ouchi Shinko Chemical Industrial Co., Ltd.) | 2 | Parts by mass |
| Cetyltrimethylammonium bromide | 2 | Parts by mass |

Example 21

An electrophotographic member was produced as in Example 20 except that Coating solution 11 was used, and was evaluated. The results of evaluation are shown in Table 20-3.

Examples 22 and 23

Coating solutions 22 and 23 were prepared in the same manner except that the amount of Quaternary ammonium salt 1 in Coating solution 1 was changed to the amount shown in Table 16. Electrophotographic members according to Example 22 and 23 were produced as in Example 1 except that Coating solutions 22 and 23 were used instead of Coating solution 1, and were evaluated. The results of evaluation are shown in Table 20-3.

TABLE 16

| Example | 22 | 23 |
|---|---|---|
| Amount of Quaternary ammonium salt 1 (part(s) by mass) | 1 | 6 |

Examples 24 and 25

Electrophotographic members according to Examples 24 and 25 were produced as in Example 1 except that the amount of MEK to be added was adjusted to change the viscosity of Coating solution 1 as shown in Table 17, and were evaluated. The results of evaluation are shown in Table 20-3.

TABLE 17

| Example | 24 | 25 |
|---|---|---|
| Viscosity of coating solution (cps) | 9 | 15 |

Examples 26 to 28

Coating solutions 26 to 28 were prepared as Coating solution 1 except that Quaternary ammonium salt 1 in Coating solution 1 was changed to Quaternary ammonium salts 18 to 20 shown in Table 18. Electrophotographic members according to Examples 26 to 28 were produced as in Example 1 except that Coating solutions 26 to 28 were used instead of Coating solution 1, and were evaluated. The results of evaluation are shown in Table 20-3.

TABLE 18

| Example | 26 | 27 | 28 |
|---|---|---|---|
| Quaternary ammonium salt | 18 | 19 | 20 |

Comparative Examples 1 to 4

Coating solutions 29 to 32 were prepared as Coating solution 1 except that Quaternary ammonium salt 1 in Coating solution 1 was changed to Ionic conductive agents 1 to 4 shown in Table 19. Electrophotographic members according to Comparative Examples 1 to 4 were produced as in Example 1 except that Coating solutions 29 to 32 were used instead of Coating solution 1, and were evaluated. The results of evaluation are shown in Table 20-4.

TABLE 19

| Comparative Example | 1 | 2 | 3 | 4 |
|---|---|---|---|---|
| Ionic conductive agent | 1 | 2 | 3 | 4 |

Ionic conductive agent 1

Ionic conductive agent 2

Ionic conductive agent 3

Ionic conductive agent 4

Ionic conductive agent 1 (made by KANTO CHEMICAL CO., INC.)

Ionic conductive agent 2 (trade name: cation IN made by NOF Corporation)

Ionic conductive agent 3 (made by TOKYO CHEMICAL INDUSTRY CO., LTD.)

Ionic conductive agent 4 Salt exchange was performed using ETHOQUAD C/25 (the anion in the ionic conductive agent 4 was chlorine ion, made by Lion Akzo Co., Ltd.) and lithium bis(trifluoromethanesulfonyl imide) to prepare Ionic conductive agent 4 having TFSI as the anion.

Me represents a methyl group, Et represents an ethyl group, and R represents an alkyl group having 8 to 18 carbon atoms.

TABLE 20-1

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Partial structure | (2) | (2) | (2) | (2) | (2) | (2) | (2) | (2) | (2) | (2) |
| $R_{21}$ | $CH_2$ | $CH_2$ | $CH_2$ | $CH_2$ | $CH_2$ | $C_4H_8$ | $C_9H_{18}$ | $C_9H_{18}$ | $CH_2$ | $CH_2$ |
| $R_{22}$ | $CH_2$ | $CH_2$ | $CH_2$ | $CH_2$ | $CH_2$ | $CH_2$ | $CH_2$ | $CH_2$ | $C_4H_8$ | $C_4H_8$ |
| $X_2$ | (3) | (3) | (4) | (4) | (3) | (3) | (3) | (4) | (3) | (4) |
| $R_{31}$ | Me | $C_6H_{13}$ | — | — | Me | Et | Me | — | Et | — |
| $R_{32}$ | Me | $C_6H_{13}$ | — | — | Me | Et | Me | — | Et | — |
| $R_{33}$ | Me | $C_6H_{13}$ | — | — | $C_{13}H_{29}$ | Et | Me | — | Me | — |
| $R_{41}$ | — | — | Me | Et | — | — | — | Me | — | Me |
| n | — | — | 2 | 1 | — | — | — | 2 | — | 2 |
| A2 | — | — | O | $CH_2$ | — | — | — | O | — | $CH_2$ |
| Anion | TFSI | TFSI | TFSI | TFSI | TFSI | TFSI | TFSI | TFSI | TFSI | TFSI |
| Quaternary ammonium salt | 1 | 2 | 3 | 4 | 5 | 6 | 7 | 8 | 9 | 10 |
| Quaternary ammonium salt added (parts by mass) | 2 | 2 | 2 | 2 | 2 | 2 | 2 | 2 | 2 | 2 |
| Binder structure | Ether | Ether | Ether | Ether | Ether | Ether | Ether | Ether | Ether | Ether |
| Elastic layer | NBR | NBR | NBR | NBR | NBR | NBR | NBR | NBR | NBR | NBR |
| Film thickness of surface layer (μm) | 15 | 15 | 15 | 15 | 15 | 15 | 15 | 15 | 15 | 15 |
| Film resistance (Ω · cm) L/L | $6.80 \times 10^6$ | $7.90 \times 10^6$ | $6.70 \times 10^6$ | $7.00 \times 10^6$ | $9.50 \times 10^6$ | $6.30 \times 10^6$ | $5.80 \times 10^6$ | $6.00 \times 10^6$ | $6.80 \times 10^6$ | $6.70 \times 10^6$ |
| Film resistance (Ω · cm) H/H | $7.30 \times 10^5$ | $7.10 \times 10^5$ | $7.00 \times 10^5$ | $7.10 \times 10^5$ | $7.10 \times 10^5$ | $6.90 \times 10^5$ | $6.80 \times 10^5$ | $6.90 \times 10^5$ | $7.20 \times 10^5$ | $7.20 \times 10^5$ |

TABLE 20-1-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Change in film resistance due to environment | 0.97 | 1.05 | 0.98 | 0.99 | 1.13 | 0.96 | 0.93 | 0.94 | 0.98 | 0.97 |
| Extraction rate (% by mass) | 1.8 | 2.2 | 2.0 | 2.0 | 2.1 | 2.2 | 2.2 | 1.9 | 1.9 | 1.8 |
| C set evaluation test | A | A | A | A | A | A | A | A | A | A |
| Low temperature and low humidity environment durability test of roller | A | A | A | A | B | A | A | A | A | A |

TABLE 20-2

|  | Example 11 | Example 12 | Example 13 | Example 14 | Example 15 | Example 16 | Example 17 | Example 18 | Example 19 | Example 20 |
|---|---|---|---|---|---|---|---|---|---|---|
| Partial structure | (2) | (2) | (2) | (2) | (2) | (2) | (2) | (2) | (2) | (2) |
| $R_{21}$ | $CH_2$ | $CH_2$ | $CH_2$ | $CH_2$ | $CH_2$ | $CH_2$ | $CH_2$ | $CH_2$ | $C_9H_{18}$ | $CH_2$ |
| $R_{22}$ | $C_6H_{12}$ | $CH_2$ | $CH_2$ | $CH_2$ | $CH_2$ | $CH_2$ | PO | $CH_2$ | $CH_2$ | $CH_2$ |
| $X_2$ | (4) | (3) | (3) | (3) | (3) | (3) | (3) | (3) | (3) | (3) |
| $R_{31}$ | — | Me | Me | Me | Me | Me | Me | Me | Me | Me |
| $R_{32}$ | — | Me | Me | Me | Me | Me | Me | Me | Me | Me |
| $R_{33}$ | — | Me | Me | Me | Me | Me | Me | Me | Me | Me |
| $R_{41}$ | Me | — | — | — | — | — | — | — | — | — |
| n | 2 | — | — | — | — | — | — | — | — | — |
| A2 | O | — | — | — | — | — | — | — | — | — |
| Anion | TFSI | $Cl^-$ | $Br^-$ | $ClO_4^-$ | NFSI | CFSI | TFSI | TFSI | TFSI | TFSI |
| Quaternary ammonium salt | 11 | 12 | 13 | 14 | 15 | 16 | 17 | 1 | 7 | 1 |
| Quaternary ammonium salt added (parts by mass) | 2 | 2 | 2 | 2 | 2 | 2 | 2 | 2 | 2 | 2 |
| Binder structure | Ether | Ether | Ether | Ether | Ether | Ether | Ether | Ester | Ester | Ether |
| Elastic layer | NBR | NBR | NBR | NBR | NBR | NBR | NBR | NBR | NBR | Hydrin |
| Film thickness of surface layer (μm) | 15 | 15 | 15 | 15 | 15 | 15 | 15 | 15 | 15 | 15 |
| Film resistance (Ω · cm) L/L | $6.40 \times 10^6$ | $1.50 \times 10^7$ | $1.70 \times 10^7$ | $8.50 \times 10^6$ | $7.00 \times 10^6$ | $6.90 \times 10^6$ | $6.80 \times 10^6$ | $1.05 \times 10^7$ | $9.00 \times 10^6$ | $9.50 \times 10^6$ |
| Film resistance (Ω · cm) H/H | $7.00 \times 10^5$ | $7.30 \times 10^5$ | $7.80 \times 10^5$ | $7.20 \times 10^5$ | $7.30 \times 10^5$ | $7.30 \times 10^5$ | $5.00 \times 10^5$ | $7.30 \times 10^5$ | $7.20 \times 10^5$ | $5.00 \times 10^5$ |
| Change in film resistance due to environment | 0.96 | 1.31 | 1.34 | 1.07 | 0.98 | 0.98 | 1.13 | 1.16 | 1.10 | 1.28 |
| Extraction rate (% by mass) | 1.9 | 2.7 | 2.6 | 2.3 | 1.9 | 1.9 | 1.7 | 2.1 | 2.1 | 1.8 |
| C set evaluation test | A | B | B | B | A | A | A | A | A | A |
| Low temperature and low humidity environment durability test of roller | A | B | B | A | A | A | A | B | B | B |

TABLE 20-3

|  | Example 21 | Example 22 | Example 23 | Example 24 | Example 25 |  | Example 26 | Example 27 | Example 28 |
|---|---|---|---|---|---|---|---|---|---|
| Partial structure | (2) | (2) | (2) | (2) | (2) | Partial structure | (1) | (1) | (1) |
| $R_{21}$ | $CH_2$ | $CH_2$ | $CH_2$ | $CH_2$ | $CH_2$ | $R_{11}$ | $C_3H_6$ | $C_3H_6$ | $C_5H_{10}$ |
| $R_{22}$ | $C_6H_{12}$ | $CH_2$ | $CH_2$ | $CH_2$ | $CH_2$ | $R_{12}$ | $C_2H_4$ | PO—$C_2H_4$ | $CH_2$ |
| $X_2$ | (4) | (3) | (3) | (3) | (3) | $R_{13}$ | $C_2H_4$ | PO—$C_2H_4$ | $CH_2$ |
| $R_{31}$ | — | Me | Me | Me | Me | A1 | N | N | CH |
| $R_{32}$ | — | Me | Me | Me | Me | $X_1$ | $N^+(Me)_3$ | $N^+(Me)_3$ | $N^+(Me)_3$ |
| $R_{33}$ | — | Me | Me | Me | Me | Anion | TFSI | TFSI | TFSI |
| $R_{41}$ | Me | — | — | — | — | Quaternary ammonium salt | 18 | 19 | 20 |
| n | 2 | — | — | — | — | Quaternary ammonium salt added (parts by mass) | 2 | 2 | 2 |
| A2 | O | — | — | — | — | Binder structure | Ether | Ether | Ether |
| Anion | TFSI | TFSI | TFSI | TFSI | TFSI | Elastic layer | NBR | NBR | NBR |
| Quaternary ammonium salt | 11 | 1 | 1 | 1 | 1 | Film thickness of surface layer (μm) | 15 | 15 | 15 |
| Quaternary ammonium salt added (part(s) by mass) | 2 | 1 | 6 | 2 | 2 | Film resistance (Ω · cm) L/L | $6.80 \times 10^6$ | $6.70 \times 10^6$ | $5.80 \times 10^6$ |
| Binder structure | Ether | Ether | Ether | Ether | Ether | Film resistance (Ω · cm) H/H | $8.50 \times 10^5$ | $7.00 \times 10^5$ | $6.50 \times 10^5$ |

TABLE 20-3-continued

|  | Example 21 | Example 22 | Example 23 | Example 24 | Example 25 |  | Example 26 | Example 27 | Example 28 |
|---|---|---|---|---|---|---|---|---|---|
| Elastic layer | Hydrin | NBR | NBR | NBR | NBR | Change in film resistance due to environment | 0.90 | 0.98 | 0.95 |
| Film thickness of surface layer (μm) | 15 | 15 | 15 | 5 | 30 | Extraction rate (% by mass) | 1.9 | 1.8 | 1.8 |
| Film resistance (Ω · cm) L/L | $9.70 \times 10^6$ | $7.50 \times 10^6$ | $4.30 \times 10^6$ | $6.40 \times 10^5$ | $7.00 \times 10^6$ | C set evaluation test | A | A | A |
| Film resistance (Ω · cm) H/H | $5.00 \times 10^5$ | $7.00 \times 10^5$ | $4.00 \times 10^5$ | $7.20 \times 10^4$ | $7.20 \times 10^5$ | Low temperature and low humidity environment durability test of roller | A | A | A |
| Change in film resistance due to environment | 1.29 | 1.03 | 1.03 | 0.95 | 0.99 |  |  |  |  |
| Extraction rate (% by mass) | 1.8 | 1.7 | 2.0 | 1.7 | 1.9 |  |  |  |  |
| C set evaluation test | A | A | B | A | A |  |  |  |  |
| Low temperature and low humidity environment durability test of roller | B | A | A | A | A |  |  |  |  |

TABLE 20-4

|  | Comparative Example 1 | Comparative Example 2 | Comparative Example 3 | Comparative Example 4 |
|---|---|---|---|---|
| Ionic conductive agent | 1 | 2 | 3 | 4 |
| Ionic conductive agent added (parts by mass) | 2 | 2 | 2 | 2 |
| Binder structure | Ether | Ether | Ether | Ether |
| Elastic layer | NBR | NBR | NBR | NBR |
| Film thickness of surface layer (μm) | 15 | 15 | 15 | 15 |
| Film resistance (Ω · cm) L/L | $5.20 \times 10^6$ | $5.00 \times 10^6$ | $3.50 \times 10^8$ | $3.50 \times 10^7$ |
| Film resistance (Ω · cm) H/H | $5.00 \times 10^5$ | $1.00 \times 10^5$ | $6.80 \times 10^6$ | $5.00 \times 10^5$ |
| Change in film resistance due to environment | 1.02 | 1.70 | 1.71 | 1.85 |
| Extraction rate (% by mass) | 6.0 | 4.0 | 2.0 | 1.9 |
| C set evaluation test | D | C | A | A |
| Low temperature and low humidity environment durability test of roller | A | A | D | C |

Comparing Comparative Example 1 in which the quaternary ammonium salt was not fixed to the resin with Example 1 in which the quaternary ammonium salt was fixed to the resin, it turns out that the extraction rate was low and a roller exudation set test gave a good result in Example 1. It is thought that this is attributed to the fixing of the quaternary ammonium salt to the binder resin. Next, comparing Example 1 with Comparative Example 2 in which the quaternary ammonium salt was not present in the side chain via the polyethylene oxide chain, it turns out that changes due to the environment were little, the extraction rate was low, and the roller exudation set test gave good results in Example 1. Consequently, it turns out that when the side chain is a hydrophobic alkylene group, a reduction in resistance under a high temperature and high humidity environment is suppressed, and bleeding is reduced because two hydroxy groups are contained in the raw material quaternary ammonium salt to increase the proportion of the quaternary ammonium salt fixed to the resin.

Comparing Example 1 with Comparative Example 3 in which carboxylic acid as the ion exchange group in the side chain was fixed to the resin, it turned out that the film resistance was low under a low temperature and low humidity environment and durability was high under a low temperature and low humidity environment in Example 1. This indicates that the quaternary ammonium cation fixed to the binder resin enables a reduction in resistance even under a low temperature and low humidity environment.

Comparing Example 1 with Comparative Example 4 in which the quaternary ammonium salt was incorporated into the main chain of the resin, it turns out that the film resistance was low under a low temperature and low humidity environment and durability was high under a low temperature and low humidity environment. This indicates that the quaternary ammonium salt present in the side chain enables a reduction in resistance.

Example 29

<Preparation of Mandrel and Elastic Layer>

Primer (trade name, DY35-051; made by Dow Corning Toray Co., Ltd.) was applied to the metal core made of SUS304 and having a diameter of 6 mm, and burned for 20 minutes in an oven heated to 180° C. to prepare a mandrel. Next, the prepared mandrel was disposed in a metal mold. The conductive agent, the filler, and the catalyst shown in Table 21 were dispersed in a raw material rubber to prepare a liquid material for forming an elastic layer, and a cavity formed in the metal mold was filled with the liquid material. The metal mold was heated for 20 minutes in an oven heated to 140° C. to cure the liquid material. After cooling the metal mold, the mandrel having a silicone rubber layer formed thereon was extracted from the metal mold, and was heated for 3 hours in an oven heated to 190° C. to complete the curing reaction of the silicone rubber layer. Thus, Rubber roller 3 including a silicone rubber elastic layer having a diameter of 12 mm and formed on the outer periphery of the mandrel was produced.

TABLE 21

| | Material | Blending amount (parts by mass) |
|---|---|---|
| Raw material rubber | Liquid silicone rubber (trade name SE6724A/B made by Dow Corning Toray Co., Ltd.) | 100 |
| Conductive agent | Carbon black (trade name: TOKABLACK #4300 made by Tokai Carbon Co., Ltd.) | 15 |
| Filler | Silica powder | 0.2 |
| Catalyst | Platinum catalyst | 0.1 |

<Preparation of Coating Solution for Forming Surface Layer>

(Preparation of Coating Solution 29)

62.9 parts by mass of silica (trade name, Aerosil 130; made by Nippon Aerosil Co., Ltd.) and 83.8 parts by mass of a urethane resin fine particle (trade name, Art-pearl C-400; made by Negami Chemical Industrial Co., Ltd.) were added to Coating solution 18, and mixed by stirring. Next, methyl ethyl ketone was added such that the percentage of the total solid content was 30% by mass, and the solution was stirred with a sand mill. The viscosity was then adjusted to 10 to 13 cps with methyl ethyl ketone to prepare Coating solution 29 for forming a surface layer.

Rubber roller 3 produced above was immersed in Coating solution 29 to form a coating of Coating solution 29 on the surface of the elastic layer in Rubber roller 3, and was dried. Rubber roller 3 was further heated for one hour in an oven heated to 140° C. to form an approximately 15 μm surface layer on the outer periphery of the elastic layer. An electrophotographic member according to Example 29 was produced.

<Evaluation of Properties of Electrophotographic Member>

[Extraction Test]

The test was performed as in Example 1. The results of evaluation are shown in Table 22.

[Measurement of Tackiness (Surface Tackiness)]

A tacking tester TAC-II (made by Rhesca Corporation) was used as a tackiness measurement apparatus. A sample to be measured was prepared by cutting the electroconductive layer according to the present invention from the electrophotographic member, and used.

The measurement was performed under the following conditions. The measurement was performed three times, and the average value was defined as the tackiness value.

The results of evaluation are shown in Table 22.

contact unit for measurement: SUS probe having a diameter of 5 mm
load sensor: LT25A-100
invading rate in contact: 30 mm/min
pull-up rate in the test: 600 mm/min
load at contact: 60 gf
contacting time: 5 seconds
measurement environment: temperature of 30° C., relative humidity of 80% RH

[Measurement of Concentration of Adhering Toner]

The concentration of an adhering toner was evaluated according to the following method.

The electrophotographic member produced in Example 29 was mounted on a yellow toner cartridge for a laser printer (trade name: LBP5300; made by Canon Inc.) as the developing roller. The yellow toner cartridge was mounted on the laser printer. Using the laser printer, a white solid image was output to coat the surface of the developing roller with a yellow toner. The developing roller in this state was taken out from the yellow toner cartridge.

The developing roller was placed on a polytetrafluoroethylene flat plate. A load of 300 gf (load of 150 gf for each end of the mandrel) was applied to the flat plate to bring the developing roller into contact with the flat plate, and was left for 60 days under an environment of the temperature of 40° C. and a relative humidity of 95% RH. The developing roller was then released from the contact state to the flat plate, and was left for 3 hours under an environment of a temperature 25° C. and a relative humidity of 45%. Subsequently, the surface of the developing roller was blown by air.

The toner adhering to the surface of the developing roller was peeled off with an adhesive tape. The adhesive tape with the yellow toner was placed on a normal paper, and the reflection density was measured with a reflection densitometer (trade name: TC-6DS/A, made by Tokyo Denshoku Co., Ltd.). For reference, an adhesive tape without a toner was similarly placed on a normal paper, and the reflection density was measured in the same manner. The reduction amount of the reflectance (%) was calculated using the reflection density of the adhesive tape without the toner as the reference. The reflection density was measured at three points in total, that is, the central portion and both ends of the developing roller, and the arithmetic average value was defined as the concentration of the toner adhering to the developing roller to be evaluated. The results of evaluation are shown in Table 22.

Example 30

Using a crosshead extruder, the unvulcanized rubber composition prepared in Example 20 was applied to the mandrel prepared in Example 29 to produce an unvulcanized rubber roller. Next, the unvulcanized rubber roller was placed in an oven heated to 150° C., and was heated for 50 minutes to cure the unvulcanized rubber. An elastic layer was prepared. Subsequently, ends of the elastic layer were cut and removed. Finally, the surface of the elastic layer was polished with a rotary grinding wheel. Thus, Rubber roller 4 including a hydrin rubber elastic layer on the outer periphery of the mandrel was produced. The elastic layer had a diameter of 12 mm.

<Preparation of Coating Solution for Forming Surface Layer>

(Synthesis of Hydroxyl Group-Terminated Prepolymer)

A mixture of 201.9 parts by mass (2.8 mol) of dry tetrahydrofuran and 103.3 g (1.2 mol) of dry 3-methyl tetrahydrofuran (mol mixing ratio 70/30) was kept at 10° C. in a reaction container. 13.1 g of 70% perchloric acid and 120 g of acetic anhydride were added, and reacted for 4 hours. Next, the reaction mixture was poured into 600 g of an aqueous solution of 20% sodium hydroxide for refining. The remaining water and solvent components were removed under reduced pressure to prepare liquid Hydroxyl group-terminated prepolymer A-2. The number average molecular weight was 3000, and the hydroxy value was 37.0 mgKOH/g.

(Synthesis of Isocyanate Group-Terminated Prepolymer)

Under a nitrogen atmosphere, 100 parts by mass of Polyol A-2 was gradually added dropwise into 19.7 parts by mass of a polymeric MDI (trade name: Millionate MR200 made by Nippon Polyurethane Industry Co., Ltd.) in a reaction container while the temperature inside of the reaction container was kept at 65° C.

After the dropwise addition was completed, the reaction was performed at 65° C. for 2 hours. The obtained reaction mixture was cooled to room temperature to prepare Isocyanate group-terminated prepolymer B-2 having 4.2% of an isocyanate group.

(Preparation of Coating Solution 30)

As the materials for the surface layer, 539.9 parts by mass of Hydroxyl group-terminated prepolymer A-2, 2 parts by mass of Quaternary ammonium salt 1, 62.9 parts by mass of silica (trade name, Aerosil 130; made by Nippon Aerosil Co., Ltd.), and 83.8 parts by mass of a urethane resin fine particle (trade name, Art-pearl C-400; made by Negami Chemical Industrial Co., Ltd.) were added to 366.4 parts by mass of Isocyanate group-terminated prepolymer B-2, and mixed by stirring.

Next, methyl ethyl ketone was added such that the percentage of the total solid content was 30% by mass, and the solution was stirred with a sand mill. The viscosity was then adjusted to 10 to 13 cps with methyl ethyl ketone to prepare Coating solution 30 for forming a surface layer.

Rubber roller 4 produced above was immersed in Coating solution 30 to form a coating of Coating solution 30 on the surface of the elastic layer in Rubber roller 4, and the coating was dried. The coating was further heated for one hour in an oven heated to 140° C. to form an approximately 15 μm surface layer on the outer periphery of the elastic layer. An electrophotographic member according to Example 30 was produced. The electrophotographic member according to Example 30 was evaluated as in Example 29. The results of evaluation are shown in Table 22.

Comparative Example 5

Coating solution 31 was prepared in the same manner except that Quaternary ammonium salt 1 in Coating solution was changed to Ionic conductive agent 1. An electrophotographic member according to Comparative Example was produced as in Example 29 except that Coating solution 31 was used instead of Coating solution 29, and was evaluated. The results of evaluation are shown in Table 22

Comparative Example 6

Coating solution 32 was prepared in the same manner except that Quaternary ammonium salt 1 in Coating solution 30 was changed to Ionic conductive agent 2. An electrophotographic member according to Comparative Example 6 was produced as in Example 30 except that Coating solution 32 was used instead of Coating solution 29, and was evaluated. The results of evaluation are shown in Table 22.

TABLE 22

|  | Example 29 | Example 30 |
|---|---|---|
| Partial structure | (2) | (2) |
| $R_{21}$ | $CH_2$ | $CH_2$ |
| $R_{22}$ | $CH_2$ | $CH_2$ |
| $X_2$ | (3) | (3) |
| $R_{31}$ | Me | Me |
| $R_{32}$ | Me | Me |
| $R_{33}$ | Me | Me |
| $R_{41}$ | — | — |
| n | — | — |
| A2 | — | — |
| Anion | TFSI | TFSI |
| Quaternary ammonium salt | 1 | 1 |
| Quaternary ammonium salt added (parts by mass) | 2 | 2 |
| Binder structure | Ester | Ether |

TABLE 22-continued

| Elastic layer | Silicone | Hydrin |
|---|---|---|
| Film thickness of surface layer (μm) | 15 | 15 |
| Extraction rate (% by mass) | 1.7 | 1.9 |
| Tackiness (gf) | 55 | 58 |
| Concentration of adhering toner (%) | 1.8 | 1.9 |

|  | Comparative Example 5 | Comparative Example 6 |
|---|---|---|
| Ionic conductive agent | 1 | 2 |
| Ionic conductive agent added (parts by mass) | 2 | 2 |
| Binder structure | Ester | Ether |
| Elastic layer | Silicone | Hydrin |
| Film thickness of surface layer (μm) | 15 | 15 |
| Extraction rate (% by mass) | 5.0 | 5.3 |
| Tackiness (gf) | 93 | 82 |
| Concentration of adhering toner (%) | 3.1 | 2.7 |

Comparing Example 29 with Comparative Example 5 in which the quaternary ammonium salt was not fixed to the resin, it turns out that the extraction rate was low, tackiness was low, and the concentration of the adhering toner was small in Example 29. It is thought that this is because the bleeding changes depending on whether the quaternary ammonium salt is fixed to the binder resin or not.

Next, comparing Example 30 with Comparative Example 6 in which the quaternary ammonium salt was not present in the side chain via the polyethylene oxide chain, it turns out that the extraction rate was low, tackiness was low, and the concentration of the adhering toner was small in Example 30. From this, it turns out that bleeding is reduced because two hydroxy groups are contained in the raw material quaternary ammonium salt to increase the proportion of the quaternary ammonium salt to be fixed to the resin.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-272394, filed Dec. 13, 2012, which is hereby incorporated by reference herein in its entirety.

What is claimed is:

1. An electrophotographic member comprising an electroconductive mandrel and an electroconductive layer, the electroconductive layer comprising a perfluorosulfonylimide anion and a resin having a structure represented by at least one of formula (1) and formula (2):

(1)

where $R_{11}$ represents an alkylene group; $R_{12}$ and $R_{13}$ each independently represent an alkylene group or an alkylene oxide group; A1 represents a methine group or a nitrogen atom; and $X_1$ represents a quaternary ammonium cation structure; and (2)

where $R_{21}$ represents an alkylene group; $R_{22}$ represents an alkylene group or an alkylene oxide group; and $X_2$ represents a quaternary ammonium cation structure.

2. The electrophotographic member according to claim 1, wherein the resin comprises the structure according to formula (2), and $R_{21}$ is an alkylene group having 1 or more and 9 or less carbon atoms, $R_{22}$ is an alkylene group having 1 or more and 6 or less carbon atoms, and $X_2$ represents one of formulae (3) and (4):

(3)

where $R_{31}$ to $R_{33}$ each independently represent an alkyl group having 1 or more and 6 or less carbon atoms; and (4)

where $R_{41}$ represents an alkyl group having 1 or more and 6 or less carbon atoms; A2 represents a methylene group or an oxygen atom; and n represents 1 or 2.

3. The electrophotographic member according to claim 1, wherein the electroconductive layer has an alkylene oxide structure as a binder component.

4. The electrophotographic member according to claim 1, wherein the electroconductive layer is prepared by reacting components (A) to (C) below:
(A) a polyol compound,
(B) a polyisocyanate compound, and
(C) at least one of quaternary ammonium salts represented by the following formulae (5) and (6):

(5)

where $R_{51}$ represents an alkylene group; $R_{52}$ and $R_{53}$ each independently represent an alkylene group or an alkylene oxide group; A3 represents a methine group or a nitrogen atom; $X_3$ represents a quaternary ammonium cation structure; and $Y_1$ represents an anion; and (6)

where $R_{61}$ represents an alkylene group; $R_{62}$ represents an alkylene group or an alkylene oxide group; $X_4$ represents a quaternary ammonium cation structure; and $Y_2$ represents an anion.

5. A process cartridge comprising a charging roller mounted thereon, the process cartridge being configured to be detachable to a main body of an electrophotographic apparatus, wherein the charging roller is the electrophotographic member according to claim 1.

6. An electrophotographic apparatus comprising an electrophotographic photosensitive member and a charging roller disposed facing the electrophotographic photosensitive member to charge the electrophotographic photosensitive member, wherein the charging roller is the electrophotographic member according to claim 1.

* * * * *